United States Patent [19]
Begg et al.

[11] Patent Number: 6,037,697
[45] Date of Patent: Mar. 14, 2000

[54] THERMIONIC CONVERTER AND METHOD OF MAKING SAME

[75] Inventors: Lester LeRoy Begg, San Diego; Holger Heinrich Streckert, Rancho Santa Fe, both of Calif.

[73] Assignee: General Atomics, San Diego, Calif.

[21] Appl. No.: 09/232,953

[22] Filed: Jan. 18, 1999

[51] Int. Cl.[7] ............................. H02N 3/00; H02N 10/00
[52] U.S. Cl. ............................ 310/306; 419/19; 376/321
[58] Field of Search .................................. 310/306, 301, 310/304, 305; 419/13, 19, 10; 376/321

[56] References Cited

U.S. PATENT DOCUMENTS

| | | | |
|---|---|---|---|
| 3,215,868 | 11/1965 | Pidd et al. | 310/4 |
| 3,218,487 | 11/1965 | Pidd et al. | 310/4 |
| 3,702,408 | 11/1972 | Longsderff et al. | 310/4 |
| 3,843,896 | 10/1974 | Rason et al. | 310/306 |
| 4,131,459 | 12/1978 | Phillips | 75/203 |
| 4,667,126 | 5/1987 | Fitzpatrick | 310/306 |
| 4,755,350 | 7/1988 | Kennel | 376/321 |
| 5,200,141 | 4/1993 | Fitzpatrick | 376/321 |
| 5,219,516 | 6/1993 | Horner-Richardson et al. | 376/321 |
| 5,279,909 | 1/1994 | Horner et al. | 429/184 |
| 5,459,996 | 10/1995 | Malloy, III et al. | 60/200.1 |
| 5,541,464 | 7/1996 | Johnson et al. | 310/306 |
| 5,644,184 | 7/1997 | Kucherov | 310/306 |

*Primary Examiner*—Nestor Ramirez
*Assistant Examiner*—K. Eizo Tamai
*Attorney, Agent, or Firm*—Fitch, Even, Tabin & Flannery

[57] ABSTRACT

A multiple cell thermionic converter having a generally tubular member of electrically conductive refractory metal with an internal cavity and a tubular envelope of electrically conductive refractory metal disposed in surrounding relationship to such generally tubular member. Electrically insulating ceramic material is disposed upon sections of facing surfaces of the envelope and tubular member, which is in the form of a body that has a central zone of plasma-sprayed refractory metal oxide selected from the group consisting of scandia, hafnia, zirconia and alumina, and a pair of flanking outer zones made of mixtures of the refractory oxide and particulate refractory metal. Refractory metal electron emitters and collectors are supported upon the ceramic bodies and juxtaposed in pairs with an annular gap therebetween to form a plurality of thermionic cells. A thin tube of refractory metal is bonded to the ceramic body by hot isostatic pressing, which also densifies the ceramic, and then machined to create spaced-apart emitters/collectors. Connectors connect the collector of one thermionic cell to the emitter of the adjacent cell to form a series interconnection with the emitter of the cell at one end and the collector of the cell at the opposite end being provided by a second section of the tubular member and the tubular envelope.

13 Claims, 3 Drawing Sheets

THERMIONIC CONVERTER AND METHOD OF MAKING SAME

This invention relates generally to thermionic converters and to methods of manufacturing such converters. More particularly, it relates to thermionic converters including a plurality of cells arranged in series connection which use tubular emitters and collectors which are respectively supported on ceramic layers attached to inner and refractory metal supports, and also to space vehicles using such converters. It also more specifically relates to methods for efficiently and economically manufacturing such thermionic converters which are adapted for high temperature operation by supply of heat either from nuclear fission or from solar energy.

BACKGROUND OF THE INVENTION

It has been well known for a number of years to convert heat to electricity through the use of thermionic converters wherein an electron emitter is heated to a sufficiently high temperature so that it emits electrons into the surrounding space. An electron collector is located in juxtaposition to the electron emitter and is maintained at a substantially lower temperature so that the electrons being emitted are received by the juxtaposed collector. The space between the emitter and the collector is usually filled with a very low pressure gas, such as cesium vapor, e.g. pressure of about 50 to 1300 Pa, in order to reduce the space charge and the work function of the emission of electrons. An electrical circuit between the collector and the emitter is completed through an external load, through which an electrical current will flow.

Early thermionic converters were generally of the single cell type, e.g. U.S. Pat. Nos. 3,215,868 and 3,218,487; many of these were intended for use with nuclear reactors. However, multi-cell thermionic converters were also developed several decades ago; for example, U.S. Pat. No. 3,702,408 shows a multiple cell arrangement that employs a central heat pipe which can be filled with a vaporizable heat transfer fluid, such as sodium, to uniformly heat its interior. Emitters are carried on the exterior heat transfer surface of the central heat pipe, juxtaposed with surrounding collectors, and a segmental type of approach is used to build a conversion apparatus of substantial length, e.g. 8–10 cells in length. U.S. Pat. No. 4,667,126 shows a totally different multicell arrangement where a plurality of electron collectors are attached to a flat wall of electrically insulating material.

U.S. Pat. No. 4,755,350 discloses a thermionic energy conversion system wherein fissionable nuclear fuel surrounds cylindrical arrangements of thermionic emitter electrodes, which in turn circumscribe collector electrodes disposed about a central heat sink that may contain a material, such as lithium hydride, which can absorb heat through phase change.

U.S. Pat. No. 5,219,516 discloses a thermionic electric converter designed for use in a nuclear reactor application where heat will be furnished to the exterior of a generally cylindrical heat pipe through which heat flows inward to an emitter of tubular shape. It emits electrons radially inward that are collected by a juxtaposed tubular collector mounted on a heat transfer pipe that effects transfer of heat axially therefrom to a heat sink in the form of a set of remotely disposed cooling fins.

U.S. Pat. No. 5,459,996 shows a thermionic converter arrangement which is part of a spacecraft 5 and which includes a black body receiver 30 designed to effect thermal storage of solar energy received via a pair of mirror assemblies 50. Conceptually shown are a plurality of radially disposed conversion devices 42 that would convert the stored heat energy to electrical power when an insulation sleeve 40 is retracted.

Although the prior art shows various types of multicell thermionic converters, including designs that may be adaptable to applications in outer space, improved designs are continuously being sought, along with methods for more efficiently and more economically making such multi-cell thermionic converters.

SUMMARY OF THE INVENTION

The invention provides a multiple cell thermionic converter and a method for making same wherein inner and outer generally tubular support members are arranged coaxially and carry a plurality of pairs of electron emitters and electron collectors that are juxtaposed to create a plurality of cells, which cells are connected in series. The emitters are supported upon ceramic material which adheres to the facing surface of one of the two axially extending support members, and the collectors are supported by ceramic material adhering to the facing surface of the other tubular support member. The ceramic material preferably has a central region of pure refractory metal oxide, preferably scandia, hafnia or zirconia, and this central region is flanked by graded regions that contain mixtures of the refractory metal oxide and particulate refractory metal which the emitters/collectors and tubular supports are respectively made.

The arrangement lends itself to particularly economical construction wherein a tubular support member can be provided with a first axially extending region that includes ceramic material which is applied by plasma-spray techniques in a manner so that a graded composition leads to the pure refractory oxide center region which in turn is followed by a similar graded region leading away therefrom. Thereafter, a thin refractory metal tube, having a length suitable for creating the desired number of either emitters or collectors, is thermally fused to the ceramic material region using hot isostatic pressing or the like which also densifies the plasma-sprayed ceramic. Following such hot pressing, the selective removal of a plurality of circumferential bands from the thermally fused thin tube by appropriate machining creates a plurality of spaced-apart emitters/collectors affixed to the tubular support. As a part of such an overall arrangement, one emitter or collector is preferably integrally formed at one end of the support member itself.

In a particularly preferred overall arrangement for use in a spacecraft, a large number of such thermionic converters, each having a group of series-interconnected cells, are arranged extending radially into a black body chamber into which sunlight is reflected by a concentrating mirror system to provide the high heat required for efficient thermionic electric power generation in space.

BRIEF DESCRIPTION OF THE DRAWINGS

FIG. 1A is an enlarged bull's-eye view of a portion of FIG. 1.

DETAILED DESCRIPTION OF THE PREFERRED EMBODIMENTS

Figure 1:
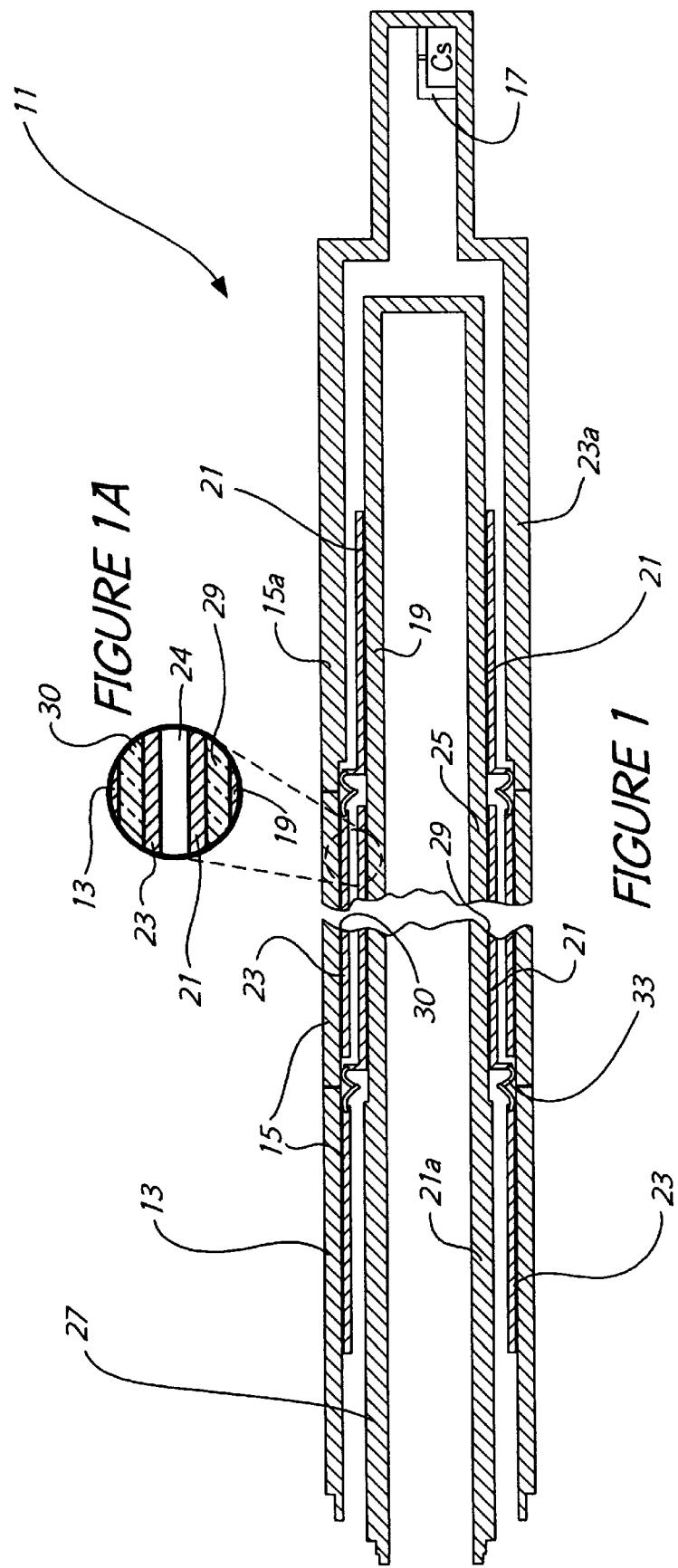
FIG. 1 is a sectional view of a thermionic converter having various features of the invention which includes a plurality of thermionic cells connected in series arrangement, with the emitters surrounding the collectors.

Illustrated in FIG. 1 is an improved thermionic converter 11 wherein a plurality of cells capable of converting thermal energy to electricity are arranged within an outer containment vessel 13 wherein a high vacuum condition is established with a minute atmosphere that preferably contains a small amount of cesium vapor which is provided by a small reservoir 17. Disposed coaxially within the containment vessel 13 is an interior tubular support member 19, on the outer cylindrical surface of which a plurality of spaced-apart electron collectors 21 are supported. A plurality of spaced-apart electron emitters 23 are located on the interior surface of the containment vessel 13 to which heat will be supplied. The emitters and collectors are juxtaposed, being separated by short annular gaps 24 in which the cesium atmosphere will be present. The interior tubular support 19 is connected to a heat sink from which heat is continuously removed to maintain the necessary temperature differential between the emitters and the collectors, as is well known in this art.

More specifically, in the particular embodiment of thermionic converter 11 illustrated in FIG. 1, the outer containment vessel 13 is a refractory metal tube of circular cross-section, which may be formed by welding together a plurality of short segments 15 for reasons discussed hereinafter. The vessel may be simply sealed at one end (not shown) while the other end contains the small reservoir 17 of cesium sufficient to provide a minute amount of cesium vapor within the containment vessel which is maintained at an extremely low pressure, e.g. about 50–1300 Pa, as well known in this art. Disposed within the outer containment vessel 13 is the tubular support member 19 of lesser diameter that is coaxially supported therein; it is connected to a heat sink (not shown) so as to be maintained at a temperature very substantially below, e.g. about 700–1200 K. below, the temperature of the containment vessel 13. The inner tubular support 19 is closed at one end (its right end in FIG. 1) and preferably extends past the other end of the containment vessel 13 to a heat sink which can include an array of fins, as known in the art, if desired. The support 19 is likely coaxially positioned within the outer containment vessel 13 by ceramic spacers (not shown). Alternatively, its other end can also be sealed so as to produce a cavity wherein a vaporizable heat transfer fluid, such as sodium or some other fluid as is well known in the art, can circulate to facilitate the removal of heat from the interior region of the support member 19 within the containment vessel. Although both the outer containment vessel 13 and the interior tubular support 19 are preferably of circular cross-section, it should be understood that they could have any desired, complementary cross-sections, e.g. elliptical or polygonal, i.e. square, hexagonal, octagonal, etc., so that the electron emitters 23 and electron collectors 21 that are supported respectively thereon would be spaced apart by a substantially uniform gap 24. It is felt that the use of supports of circular cross-section facilitates machining, and for this reason such use is preferred.

It is contemplated that the thermionic converter 11, in order to operate efficiently, will need to heat the emitters 23 to a temperature of at least about 1700 K. and preferably to about 1900 to 2200 K.; moreover, a temperature differential of at least about 700 K. and preferably between about 900 K. and 1200 K. is maintained between the electron emitters and the electron collectors. Accordingly, the materials used in the construction of the thermionic converter 11 must be capable of operation for extended periods of time at such temperatures, and the materials of construction are chosen accordingly. Refractory metals or other suitable high temperature materials are used for the containment vessel 13, the inner tubular support 19, the electron emitters 23 and the electron collectors 21. Examples of these materials which are well known in this art include tungsten, molybdenum, niobium, rhenium, tantalum, and other rare earth metals, as well as alloys thereof, such as TGM (99% Mo, 0.5% Ti, 0.07% Zr and 0.05% C) and TCZ; however, tungsten, niobium and molybdenum are preferred. For the emitters, there may be instances where it will be desirable to employ composite materials; for example, a tungsten substrate with a rhenium overlayer may be used.

The exterior surface of the inner tubular segment 19 is formed with a first major section 25 of extended length having a constant exterior diameter and a shorter second minor section 27, which has a greater exterior diameter and itself serves as collector 21a at the left end of the array of cells. The elongated first section 25 is provided with a series of coatings, one atop another, that together constitute an elongated ceramic body 29 that is thermally conductive but electrically insulating. This ceramic body 29 permits a plurality of spaced-apart collectors 21 to be supported on the exterior surface of the tubular support 19, which faces the interior surface of the tubular outer containment vessel 13.

The containment vessel 13 is preferably formed from a plurality of segments 15 which have identical diameters and which are welded together at their respective ends, each segment has a similar electrically insulating, thermally conductive ceramic layer 30 which has been deposited on the exterior surface of an emitter 23 and then thermally bonded to the tubular segment 15. An elongated segment 15a of the containment vessel, located at the right end, has a smaller interior diameter and no ceramic layer; it serves as the emitter 23a for the thermionic cell at the right end of the series of thermionic cells. Although for purposes of illustration, only a few thermionic cells are illustrated, it should be understand that a series of about 10 cells total are commonly used in order to achieve the desired voltage level.

As can be seen, there are a plurality of emitters 23, including the right emitter 23a that is formed by a segment of the containment vessel itself, that are carried by the interior surface of the refractory metal containment vessel 13. Each of the emitters 23 is located in juxtaposition with one of the collectors 21 that is either a part of or supported upon the interior tubular support member 19. Because these assemblies will be subject to substantial temperature excursions, it is important that such be given consideration in the design so that the elongation and contraction effects of these changes in temperature be minimized; otherwise, stresses may be set up that would ultimately result in degradation of various of the constructions. There are inherent differences in coefficients of thermal expansion (CTE) between a refractory metal and most electrically insulating ceramic oxide materials; however, it has been found that, by plasma-spraying the exterior surface of a refractory metal support tube or electrode with a plurality of layers comprising mixtures of finely particulate refractory metal and refractory metal oxide, a strong and stable intermediate ceramic body is provided. An outermost layer of such a thin body that will be in contact with the refractory metal surface is created using a mixture of particulate refractory metal and refractory metal oxide that includes at least about 80 weight % of the refractory metal and preferably at least about 90 weight % thereof. Preferably, the CTE of the outermost layer will be within about 10% of the refractory metal with which it is in contact. Because the general intention is to reasonably closely match the ceramic mixture to the refractory metal, the particulate refractory metal used is preferably the same as the refractory metal support tube or electrode, or one that is closely similar in CTE and other physical and chemical characteristics. If emitters are made of a layered composite, the refractory metal of the outer surface is preferably used as the particulate in the ceramic layer. Generally, the particulate refractory metal is supplied to the plasma spray device in the form of particles having a size not greater than about 10 µm, and the refractory metal oxide is supplied in the form of particles having an average size between about 0.2 and about 0.4 µm.

The refractory metal oxide should be chemically compatible with the refractory metal support member and the electrodes and should be stable at the temperatures of operation. Although a refractory metal oxide will not have a thermal conductivity approaching that of the refractory metal, those having relatively high CTEs are preferred. For support members formed of tungsten, molybdenum, rhenium and niobium, the preferred refractory oxides for use in making the ceramic body are scandia, hafnia, zirconia and alumina; however, other refractory metal oxides, including thoria, lanthania, gadolinia, europia and beryllia, may alternatively be employed. Alumina may be used in association with the collectors where the temperature is lower, but usually would not be used with the emitters if cesium is to be included in the atmosphere.

As above indicated, the outer zone should have a major percentage of particulate refractory metal (preferably the same refractory metal as that of the support member or electrode) so that it will have strong adherence to the exterior surface, and this outer layer may have a thickness of about 100 µm. Although a thicker single outer layer could be used upon which a layer of pure refractory oxide is then deposited, it is found that superior results are achieved when a gradation of the content of particulate refractory metal in the mixture with, for example, scandia is used. For example, a plurality of layers may be plasma-sprayed onto the surface, each about 50 µm in thickness and each having about 10 to 20% less particulate refractory metal and 10 to 20% more scandia until a central zone of substantially pure scandia is reached. Because it is this central zone that provides the major electrical insulating properties, this central zone is preferably at least about 500 µm thick. Once this substantially pure scandia central zone has been deposited, the plasma-spraying process is reversed, thereafter applying layers with gradually increasing amounts of refractory metal.

The particulate refractory metal that is employed in this other outer zone which flanks the central, substantially pure scandia zone is preferably the same as the refractory metal that forms the electrode that will be supported thereon or the outer support member to which it will be thermally bonded. More preferably, because of the major temperature excursions to which the thermionic converter will likely be subjected in moving from ambient temperature, which in outer space will be a relatively low figure, to its operating temperature, it is preferred that each tubular support and the emitter or collectors that will be supported thereupon are made of the same refractory metal or at least of refractory metals having closely similar CTEs.

Plasma-spraying allows the thickness of each of these ceramic layers to be closely controlled and also accomplishes excellent adherence to the refractory metal and between adjacent layers. Generally, it is desired that the thickness of the overall ceramic body that is plasma-sprayed onto the exterior refractory metal surface should be between about 0.8 mm and 1.2 mm for the emitter, with a preferred target value for such a ceramic layer being about 1 mm in a thermionic conversion device in which the outer diameter of the containment vessel is about 3 cm. For the collector, the ceramic layer should have a total thickness between about 0.4 mm and 0.6 mm, with a target value of about 0.5 mm.

Once such a thermally conductive electrically insulating ceramic body 29 has been deposited upon the surface of the major section 25 of the refractory metal support tube 19, the next step is to affix the emitters or collectors thereto. Although the emitters or collectors may be individually formed and then individually thermally bonded to the outer zone of the ceramic body 29, it has been found that it is particularly economical and efficient to thermally bond a thin tube having a length sufficient to provide the desired number of emitters or collectors in the multicell converter. For example, if the intention is to have ten cells in series, then the length of the tube might be of sufficient length to provide collectors for nine cells, with the tenth cell collector being provided by the second section 21a of the support member 19.

It has been found that hot isostatic pressing is an excellent procedure for affixing individual electrodes or an elongated thin tube to the intermediate ceramic body or for bonding a ceramic-coated electrode to an outer support member, and it also fully densities the plasma-sprayed ceramic layers. Generally, the plasma-sprayed layers of refractory metal oxide or a mixture of particulate refractory metal and refractory metal oxide have a density of about 70% of maximum theoretical density, and the thermionic converter functions in a superior fashion when the ceramic body is essentially fully dense. The use of high temperature and pressure which is provided by hot isostatic pressing has been found to not only create the desired strong thermal bonding but to simultaneously effect the densification of the plasma-sprayed ceramic layers. For example, a thin tube of tungsten, molybdenum or niobium, about 1 mm in thickness, can be effectively thermally bonded to an adjacent ceramic surface by hot isostatic pressing for about 1 hour at about 1700° C. At the same time, a ceramic body having the target thickness of about 1 mm is reduced to 0.7 mm, while a body about 0.5 mm thick is reduced to about 0.3 mm. For example, tungsten or rhenium-coated tungsten may be used for the emitters, and niobium may be used for the collectors.

Once such a thin tube about 0.5 to 2 mm thick has been thermally bonded to the intermediate ceramic body 29 on the support tube 19, a grinding or other suitable machining procedure is used to mechanically remove eight annular bands at equal intervals along the length of the tube, thus creating nine individual electrodes which serve as the illustrated collectors 21. In the illustrated embodiment, individual emitters 23 which have ceramic bodies 30 that have been plasma-sprayed upon their exterior surfaces are thermally bonded to tube segments 15 by hot isostatic pressing which simultaneously densifies the plasma-sprayed ceramic body 30.

In the embodiment illustrated in FIG. 1, once both the interior support tube 19, which carries the ten electron collectors 21, and the ten segments 15 and 15a of the containment tube 13, which provide the ten emitters 23, 23a, have been fabricated, assembly is ready to begin. As the result of such assembly, the emitters and collectors will be juxtaposed in pairs to create ten thermionic cells in a row. The collector 21 of each cell is electrically connected to the emitter 23 of the next adjacent cell to the left to effect electrical series connection where the individual voltages generated will be additive. A suitable intercell electrical connector 33 is used, for example one similar to that shown in FIG. 2 of the '408 patent. Such metallic electrical connectors 33 are preferably slotted or otherwise interrupted so as to permit cesium vapor to reach the annular gaps 24 between the juxtaposed electrodes throughout the length of the 10-cell thermionic convertor.

In operation of the converter 11 depicted in FIG. 1, a suitable heat source is used so as to uniformly heat the exterior surface of the containment vessel 13 which may, for example, be a tungsten tube about 1 mm thick, having an outer diameter of about 3 cm and a main body length of about 50 cm, exclusive of the end fittings that are disposed beyond the ten-cell main region and the heat sink portion. Preferably, the temperature is raised to at least about 1900 K., and temperatures in the range of about 2100–2200 K. are more preferably employed. If the exterior of the tungsten containment vessel is at a temperature of about 2100 K., the emitters will be at a temperature of between about 2000 and about 2050 K. which will produce thermionic electrons in the annular gap 24 between the emitters and the collectors. Cesium vapor, which finds its way to these gaps between electrodes (which will be only about 0.1 and about 0.5 mm thick) in this extremely low pressure environment, e.g. about 100 Pa, will neutralize the space charge between the emitters and the collectors.

The graded ceramic bodies 29 and 30 effectively support the emitters and collectors upon the respective support tubes, while minimizing the stress that would otherwise occur during temperature excursions between ambient and operating temperatures. Moreover, the flexible connectors 33 accommodate any lineal difference in expansion/contraction between the outer containment vessel 13 and the interior support tube 19 that occurs as a result of temperature changes and temperature differential at operating temperature. Through the employment of a suitable heat sink (not shown) at the left end of the inner support tube 19, the temperature of the collectors 21 that are carried on the tube is maintained at about 900–1000 K. Because the support tube 19 is suitably electrically isolated from the outer containment vessel 13, as by ceramic spacers (not shown), an emitter terminal can be formed as a part of the containment vessel 13, and a collector terminal can be formed as a part of the inner support tube 19. As a result, useful electric power is generated from this multiple cell thermionic converter 11 at high efficiency and at relatively high voltage, making it an excellent choice for producing power in a spacecraft environment.

Figure 2:
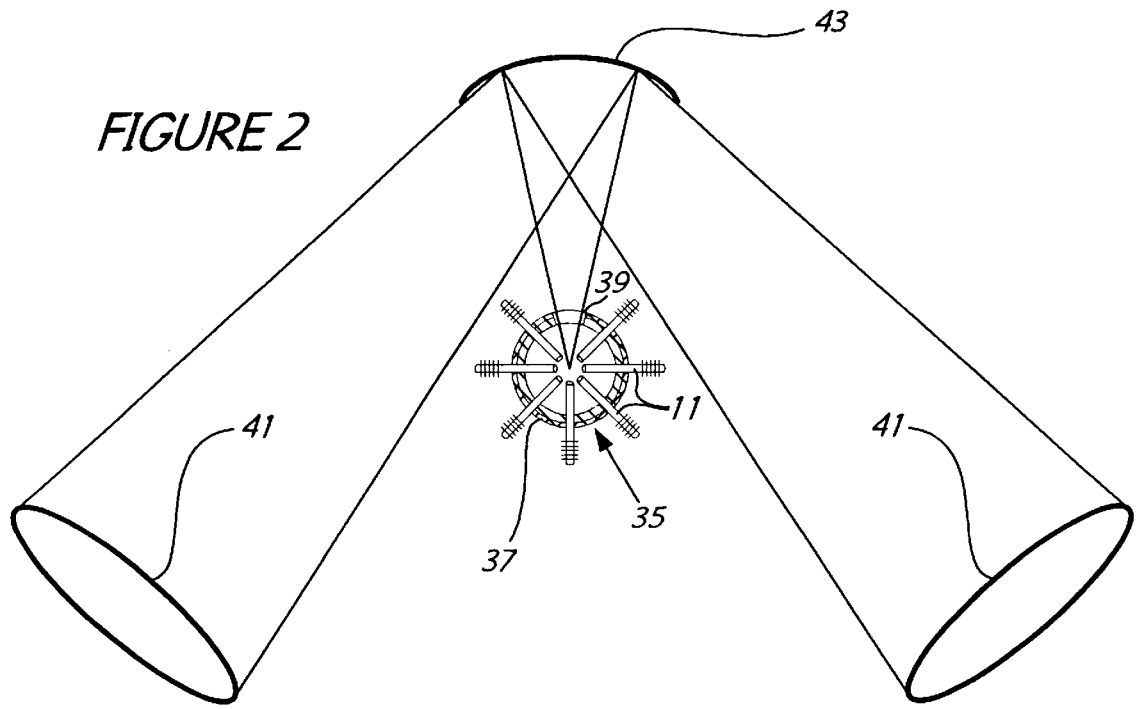
FIG. 2 is a schematic view of a spacecraft employing a plurality of the thermionic converters illustrated in FIG. 1.

Shown schematically in FIG. 2 is a spacecraft which includes a housing 35 that functions as a black body to absorb solar energy directed to it by an energy concentration system. The housing has a structural wall 37 in which an opening 39 is provided. The sun's rays may be collected by generally conical collectors 41 which are aimed at a concave secondary concentrator 43 which reflects the solar rays provided by the collectors 41 and focuses them along a path that enters the housing 35 through the opening 39. The outer wall of the housing is covered with thermal insulation 45 (see FIG. 3). The structure may rely upon the size of the opening 39 and the geometry of the interior to generally diffuse the sun's rays so that they remain within the black body housing 35 and do not shine back onto the secondary converter 43. A representative housing might be a sphere or cylinder having a diameter of between about 0.5 to 1 meter, which may have an opening not greater than about 1 to 3% of the surface area of the sphere; smaller housings may have openings of about 5%. During the spacecraft operation, the conical collectors 41 which are deployed can be rigid or inflatable, and they are generally designed to achieve a high concentration ratio of solar energy and to accurately focus these rays upon the secondary concentrator 43 or, alternatively, directly through the opening 39 into the black body. The secondary concentrator 43 may be made of a polished metal, e.g. rhenium, osmium, tungsten, tantalum, molybdenum, hafnium, ruthenium or iridium, or of any other suitable material having a highly reflective surface.

Figure 3:
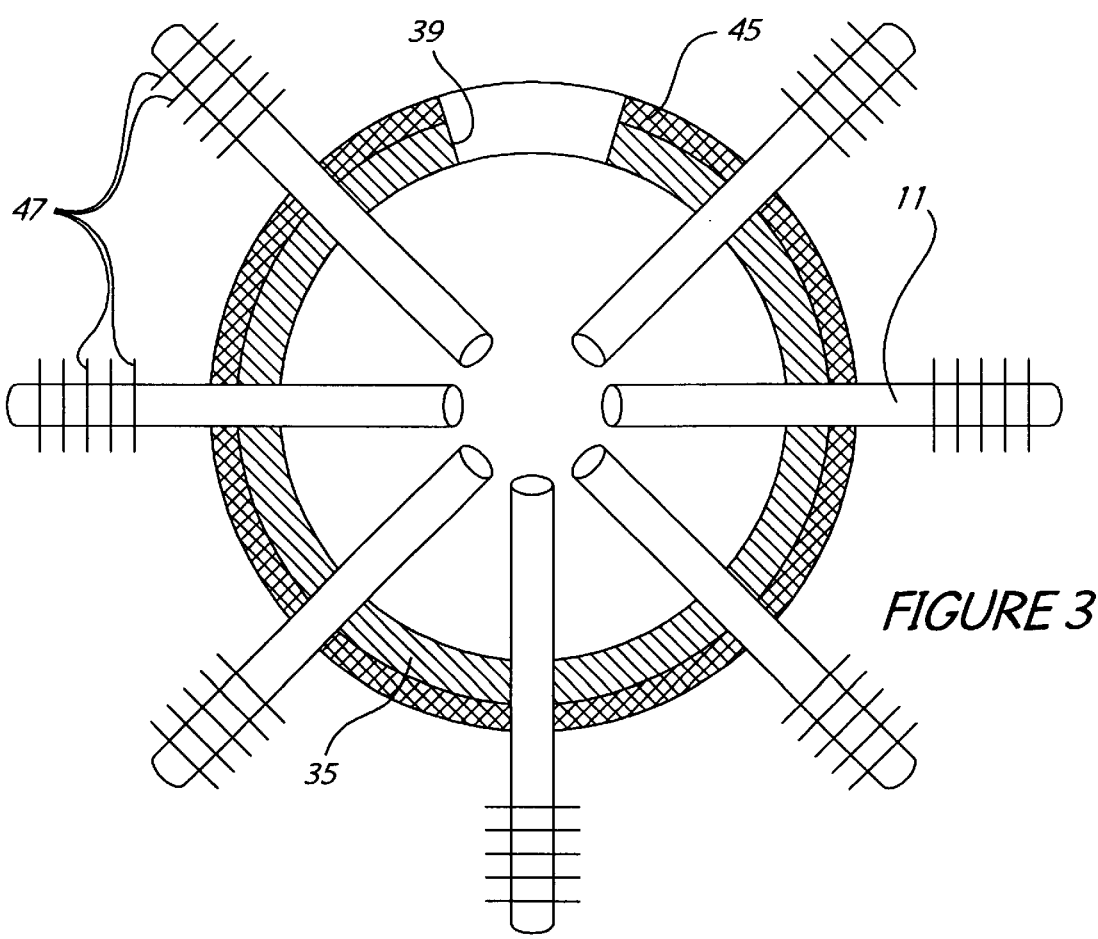
FIG. 3 is an enlarged sectional view through a portion of the spacecraft of FIG. 2.

As best seen in FIG. 3, the multiple cell thermionic converters 11 are mounted so as to penetrate through the structural housing wall 35 and the thermal insulation 45 on the housing, extending generally radially into the black body region into which solar heat is being directed, while one axial end of each thermionic converter is disposed exterior of the housing 35 where it may be provided with a suitable heat sink, such as multiple fins 47 which serve to effectively radiate heat therefrom. Thus, the cold temperature of outer space is effectively employed to maintain a satisfactory temperature differential between the collectors 21 and the emitters 23, which are being heated to a temperature of about 2000 K., as a result of which electrical power will be efficiently generated that can be used to power instrumentation carried within the spacecraft so long as heating continues.

Figure 4:
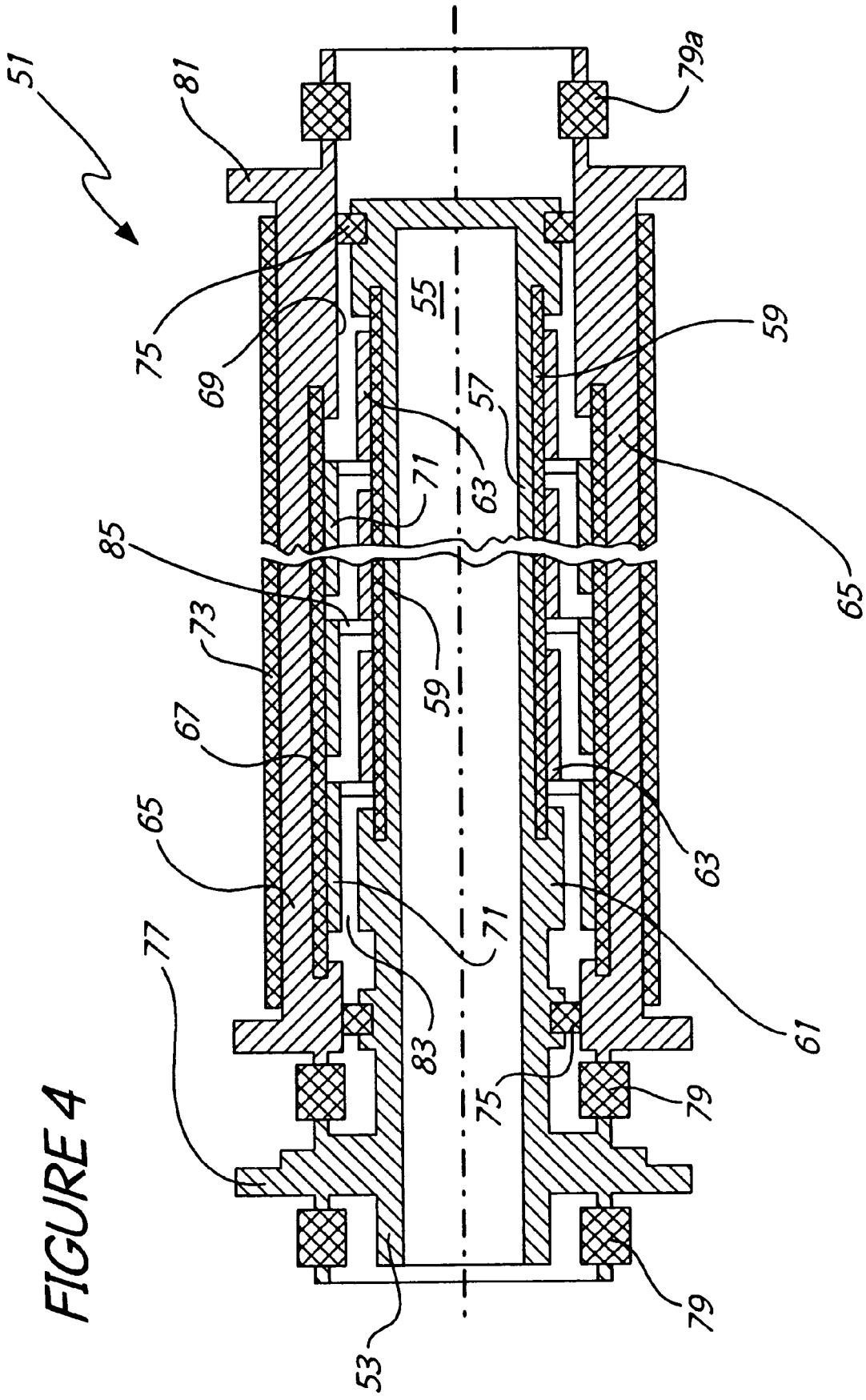
FIG. 4 is a sectional view similar to FIG. 1 of an alternative embodiment of a thermionic converter embodying various features of the invention, wherein the collectors surround the emitters.

Illustrated in FIG. 4 is a thermionic converter 51 in which the positions of the emitters and the collectors are reversed in order to operate using the supply of heat within a central axial region. Such a device is particularly useful for applications within a nuclear reactor, which is the object of the converter design shown in the '408 patent. Centrally within the thermionic converter 51 there is a generally tubular support member 53 of refractory metal that defines an interior, axially disposed cavity 55 designed to hold fissionable nuclear fuel material or some other source of high temperature heat. A first elongated region 57 of the exterior surface of the central tube 53 is coated with a graded, electrically insulating, thermally conductive ceramic body 59 of the character hereinbefore described. In the region at the left end of the elongated section 57, a short section of larger diameter is provided which serves as an integral emitter 61 for the first cell of the series.

A plurality of spaced-apart emitters 63 are located long the ceramic body 59. They are preferably fashioned in the same manner as hereinbefore described for making the series of collectors 21. Alternatively, individual emitters 63 can be fitted over the surface of the ceramic layer 59 on the tube and then thermally bonded to the outer surface of the ceramic body as by hot isostatic pressing or the like.

Surrounding the emitter-carrying central tubular support 53 is an outer refractory metal, tubular structure 65 which has one major elongated interior surface region which carries a graded ceramic body 67 and a plurality of spaced-apart collectors 71 and a right end region of lesser diameter that serves as an integral collector 69. The collectors 71 are preferably formed from an elongated thin tube upon which a ceramic body 67 is formed by plasma-spraying layers thereupon, as earlier described. Thermal bonding between the surface of the annular ceramic body 67 on the tube and the interior surface of the outer tube 65 is carried out by hot isostatic pressing. The tube is then ground to remove spaced-apart bands as previously described and create the individual collectors 71. The exterior surface of the outer tube 65 is preferably provided with an electrically insulating ceramic layer 73, an arrangement which is satisfactory so long as heat is being generated internally within the converter.

The central tube 53 is coaxially supported within the outer tube through the use of electrically insulating ceramic spacers 75 located near the right and left ends of the assembly. At the left end, a ring structure 77 is affixed in surrounding relationship to the central support tube 53 and serves as an emitter terminal of the converter 51, being is electrically connected with the integral left emitter 61. This ring structure 77 is structurally interconnected with the outer support tube 65 but electrically isolated therefrom, and if desired with a second thermionic converter 51, by annular metal-ceramic seals 79. The right end of the outer support tube 65 is formed with an annularly extending flange 81, and it is in turn interconnected by similar annular seal 79a either with additional structural support or with yet another thermionic converter 51.

In the assembly of the thermionic converter 51, it can be seen that the emitters and collectors are juxtaposed with one another, separated by an annular gap 83, to form the desired plurality of thermionic cells. Shown schematically are intercell connectors 85 that join the collector 71 of one cell to the emitter 63 of the next adjacent cell to establish the desired series interconnection of, for example, ten thermionic cells in a row. The voltage generated from all ten cells is additive and is available through the terminals 77, 81. Prior to assembly, the connectors 85 may be electrically connected, for example, to the emitters 63, as by welding or brazing at the nine different locations. Then following assembly of the central tube 53 coaxially within the outer tube 65, the other ends of the connectors 85 may be appropriately simultaneously brazed to the collectors 71, while optionally rotating the assembly to generate centrifugal force and at the same time heating to a temperature sufficient to melt and react the previously deposited brazing compound. Alternatively, the construction may be made in segmental fashion as described with respect to the thermionic converter 11.

Although the invention has been described with respect to certain preferred embodiments which constitute the best mode presently known by the inventors for achieving this inventive concept, it should be understood that various changes and modifications as would be obvious to those having the ordinary skill in this art may be made without departing from the scope of the invention which is defined by the claims appended hereto. For example, a greater or lesser number of thermionic cells can be arranged in series interconnection in order to provide a desired voltage.

Particular features of the invention are emphasized in the claims which follow.

What is claimed is:

1. A multiple cell thermionic converter comprising:

an inner generally tubular support member of refractory metal having a body of thermally conductive, electrically insulating ceramic material attached to an exterior surface thereof, an outer tubular support member of refractory metal disposed in surrounding relationship to said inner support member and having a body of thermally conductive, electrically insulating ceramic material attached to an interior surface thereof, a plurality of electron emitters of refractory metal supported upon said ceramic material on either said interior surface or said exterior surface, in axially spaced-apart relationship to one another, a plurality of electron collectors of refractory metal supported upon said ceramic material on the other of said interior surface and said exterior surface, in axially spaced-apart relationship to one another, said emitters and said collectors being juxtaposed in pairs with an annular gap therebetween to form a plurality of thermionic cells, and a plurality of connectors which connect the collector of one said thermionic cell to the emitter of an adjacent said cell, said ceramic material bodies each including a central region of substantially pure refractory metal oxide and flanking regions each in the form of a mixture of said refractory metal oxide and particulate refractory metal.

2. The thermionic converter according to claim 1 wherein said refractory metal oxide is scandia, hafnia, zirconia or alumina.

3. The thermionic converter according to claim 1 wherein said refractory metal of said emitters and of said collectors is independently selected from the group consisting of tungsten, niobium, tantalum, rhenium, molybdenum and alloys thereof.

4. The thermionic converter according to claim 1 wherein said electron emitters are made of the same refractory metal as the support member on which they are carried, wherein said refractory metal oxide is scandia, and wherein said particulate refractory metal in one said flanking region of each said ceramic material body is the same as the particulate refractory metal of said other flanking region thereof.

5. The thermionic converter according to claim 1 wherein said plurality of electron emitters are thermally bonded to the surface of said ceramic material body that is attached to the surface of said support member.

6. A multiple cell thermionic converter comprising:

a generally tubular member of electrically conductive refractory metal having an internal cavity, a tubular envelope of electrically conductive refractory metal disposed in surrounding relationship to said generally tubular member, electrically insulating ceramic material disposed upon a first section of an interior surface of said tubular envelope and upon a first section of an exterior surface of said generally tubular member, said ceramic material being in the form of a body that has a central zone which consists of a refractory metal oxide selected from the group consisting of scandia, hafnia, zirconia and alumina, and that has a pair of flanking outer zones that are mixtures of said refractory metal oxide and particulate refractory metal, at least one of which outer zones containing the same refractory metal as said respective tubular member, a plurality of refractory metal electron emitters supported upon said ceramic material on either said exterior surface of said generally tubular member or on said interior surface of said tubular envelope, in axially spaced-apart relationship to one another, a plurality of refractory metal electron collectors supported upon said ceramic material on the other of said exterior surface and said interior surface, in axially spaced-apart relationship to one another, said emitters and said collectors being juxtaposed in pairs with an annular gap therebetween to form a plurality of thermionic cells, and a plurality of connectors which connect the collector of one said thermionic cell to the emitter of an adjacent said cell to form a series interconnection of said cells spaced along said tubular member and said tubular envelope, with the emitter of the cell at one end of said series being provided by a second section of either said tubular member or said tubular envelope, and with the collector of the cell at the opposite end of said series being provided by a second section of the other of said tubular member and said tubular envelope.

7. The thermionic convertor according to claim 6 wherein said electron emitters and said electron collectors are made of the same refractory metal as said tubular member or said tubular envelope upon which they are respectively supported.

8. The thermionic converter according to claim 7 wherein said tubular envelope structure is made of tungsten and said second section thereof is shaped to serve as an emitter.

9. The thermionic converter according to claim 8 wherein said generally tubular member is made of niobium and said second section is shaped to serve as a collector.

10. The thermionic converter according to claim 6 wherein said generally tubular member has an outer surface of circular cross-section and wherein said tubular envelope has an interior surface of circular cross-section.

11. The thermionic converter according to claim 10 wherein said emitters are supported upon said ceramic material disposed upon said tubular envelope, wherein means are provided for removing heat from said generally tubular member during operation so as to maintain said member and said plurality of electron collectors at a temperature at least about 700 K. lower than the temperature of said electron emitters.

12. A space vehicle comprising a plurality of the thermionic converters according to claim 11, heat sink means having extended surface area which are attached to one end of each of said converters, a black body vessel having an outer wall with an opening formed therein, thermal insulation attached to the exterior of said vessel wall, and concentrating means in association with said vessel for delivering a concentration of the rays of the sun through said opening and into said vessel, said converters being supported so as to extend through said vessel wall with said plurality of cells located therewithin and with said heat sink means being in thermal conducting relation with said generally tubular member and located exterior of said vessel, whereby said converters are being directly heated by the concentrated rays of the sun.

13. The thermionic converter according to claim 10 wherein said internal cavity of said generally tubular member is designed to contain nuclear fuel material as a part of an overall fuel element and wherein said construction permits efficient testing of said multicell converter by insertion of electrical heating means in said cavity prior to installation of nuclear fuel.

* * * * *